United States Patent [19]

Yoshida

[11] Patent Number: 4,598,412
[45] Date of Patent: Jul. 1, 1986

[54] BINARY DIGITAL DATA SIGNAL REPRODUCING CIRCUIT IN DIGITAL DATA TRANSMISSION SYSTEM

[75] Inventor: Tadahiro Yoshida, Kawasaki, Japan

[73] Assignee: Nitsuko Limited, Kawasaki, Japan

[21] Appl. No.: 700,082

[22] Filed: Feb. 11, 1985

[30] Foreign Application Priority Data

Feb. 9, 1984 [JP] Japan ................... 59-20766

[51] Int. Cl.$^4$ ........................... H04L 25/08
[52] U.S. Cl. ......................... 375/94; 307/265;
307/494; 328/58; 329/104; 375/99
[58] Field of Search .......... 375/94, 99; 329/106,
329/104; 307/494, 265, 268; 328/58, 61

[56] References Cited

U.S. PATENT DOCUMENTS 3,673,559 6/1972 Schwartz ................... 328/58

FOREIGN PATENT DOCUMENTS 0012258 2/1978 Japan ..................... 375/99

Primary Examiner—Marc E. Bookbinder
Attorney, Agent, or Firm—Roberts, Spiecens & Cohen

[57] ABSTRACT

A reproducer for reproducing a binary digital data signal from a signal received at a receiver side. A pulse train is detected from the received signal at a pulse detector. Each pulse in the pulse train sets a first D-type flip-flop, which is, in turn, cleared by a clear pulse produced by a second D-type flip-flop in response to a clock pulse just after the first D-type flip-flop is set. The output of the first D-type flip-flop is applied to a data input terminal of a third D-type flip-flop and is taken into the third D-type flip-flop by the same clock pulse. The clock pulse repetition frequency is synchronous with the binary digital data signal. Thus, the reproduced binary digital data signal is obtained on an output of the third D-type flip-flop.

6 Claims, 4 Drawing Figures

BINARY DIGITAL DATA SIGNAL REPRODUCING CIRCUIT IN DIGITAL DATA TRANSMISSION SYSTEM

BACKGROUND OF THE INVENTION

1. Field of the Invention

This invention relates to a digital data transmission system, and in particular, to a binary digital data signal reproducing circuit used at a receiving side in the digital data transmission system.

2. Description of the Prior Art

In the digital data transmission system, data to be transmitted is prepared into a binary digital data signal which comprises a plurality of binary bits of "0" and/or "1", each bit having a predetermined bit length. The digital data signal is sent out to a digital transmission line from a transmitter side after being usually converted to a bipolar signal. At a receiver side, the digital data signal is reproduced from a signal received from the transmitter side through the transmission line.

The signal sent out to the transmission line is distorted during transmission due to affection of noise and/or the transmission property of the transmission line. Therefore, the receiving side has usually a complicated circuit for reliably reproducing the binary digital data signal from the signal received thereat.

SUMMARY OF THE INVENTION

An object of the present invention is to provide a circuit for reproducing a binary digital data signal from a received signal at a receiver side in a data transmission system, which is simple in the circuit arrangement.

This invention provides a novel circuit for reproducing a binary digital data signal at a receiver side in a data transmission system wherein the binary digital data signal with a predetermined bit length is transmitted to the receiver side from a transmitter side through a digital transmission line.

The binary digital data signal reproducing circuit according to the present invention comprises pulse detecting circuit means for comparing the signal received at the receiver side with a reference signal level and detecting pulse signals on the received signal to provide a first pulse train comprising the detected pulses, and clock pulse generating means for generating clock pulses having a repetition time interval equal to the predetermined bit length.

The first pulse train and the clock pulses are applied to first circuit means, which thereby provides a second pulse train. Each pulse of the second pulse train has a controlled pulse width which is determined by a time duration from an application of a corresponding one pulse of the first pulse train to an application of one clock pulse just after the application of the corresponding one pulse.

The second pulse train is applied to second circuit means and are sampled thereat by the clock pulses. Thus, the binary digital data signal is reproduced and is obtained from the second circuit means.

According to an aspect of the present invention, the first circuit means comprises two delay flip-flop circuits (D-type flip-flops) and a NAND circuit.

The second circuit means also comprises a D-type flip-flop.

Further objects, features and other aspects of the present invention will be understood from the following detailed description of preferred embodiments of the present invention with reference to the accompanying drawings.

BRIEF DESCRIPTION OF THE DRAWINGS

FIG. 3 is a schematic view illustrating a main part of another embodiment; and

DETAILED DESCRIPTION OF PREFERRED EMBODIMENTS

Figures 2, 4:
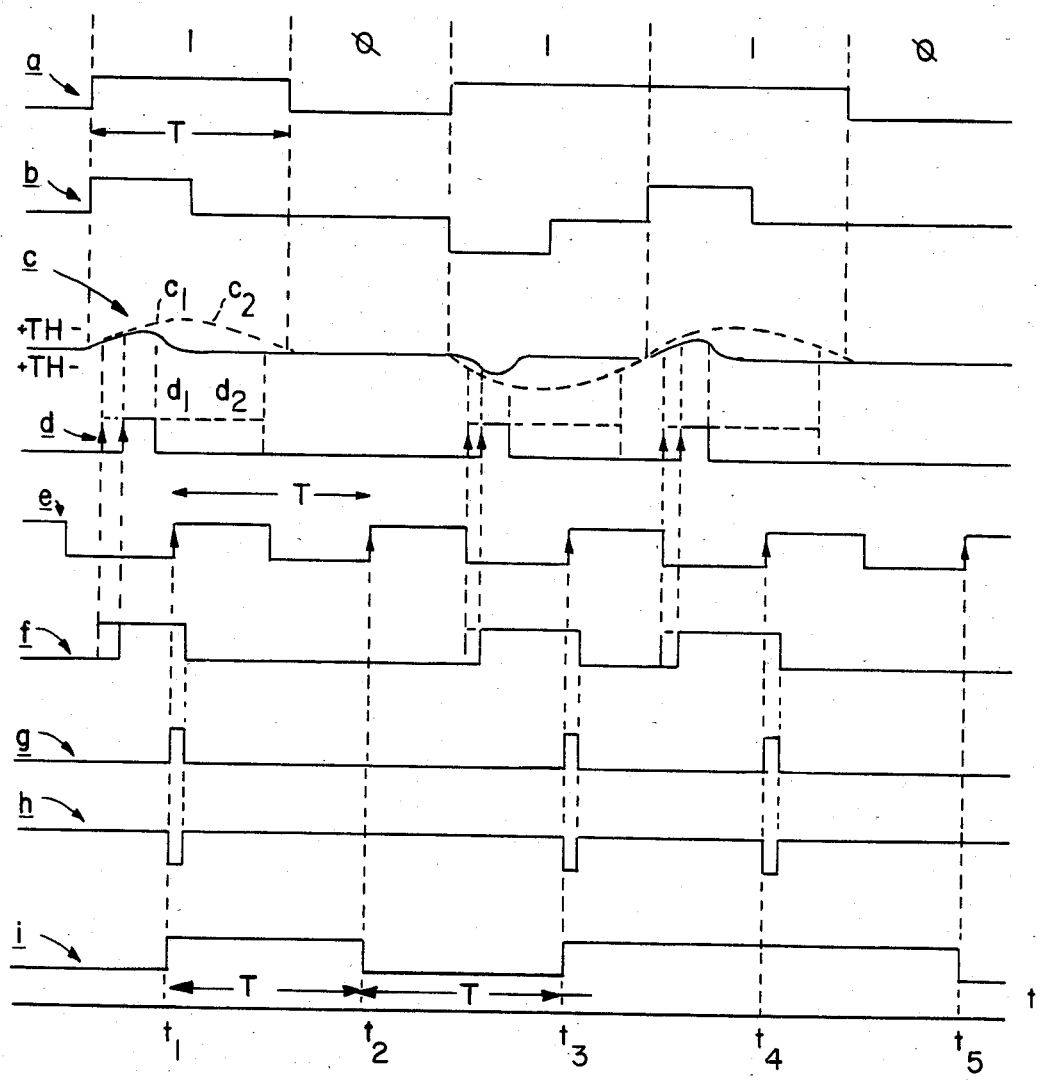
FIG. 2 is a view illustrating a function table of a D-type flip-flop.
FIG. 4 is a view illustrating waveforms at various points in the circuit of FIG. 1.

In a data transmission system, a binary digital data signal is prepared at a transmitter side. Referring to FIG. 4, a binary digital data signal comprises a plurality of binary bits, as shown at a. The binary digital data as shown is, for example, "10110". Each bit has a predetermined length T.

The binary digital data signal a is converted to a bipolar signal as shown at b. The bipolar signal is sent out to a digital transmission line. The signal generally suffers from waveform distortion during transmitting through the line, as described above. Therefore, the signal received at a receiver side is distorted as shown at c in FIG. 4, in comparison with the bipolar signal b at the transmitter side. The waveform distortion varies as shown, for example, at $C_1$ and $C_2$ in FIG. 4, due to variation on transmission property of the line.

The received signal c is compared with a positive and a negative reference levels $+Th$ and $-Th$ as a pulse detector such as a dual sensing amplifier, and a unidirectional pulse train is, therefore, derived. Each pulse of the unidirectional pulse train must have a waveform corresponding to each pulse of the bipolar signal b. However, it is different in the pulse width as shown at $d_1$ and $d_2$ in FIG. 4, because the received signal has a waveform distortion as shown at $C_1$ and $C_2$ in FIG. 4.

Since the received signal has a waveform distortion and since the distortion is not always constant, it is difficult to reproduce the binary digital data signal (such as a in FIG. 4) from the pulse train (such as d in FIG. 4) derived from the received signal (such as c in FIG. 4). Therefore, in conventional data transmission systems, the receiver side has a complicated circuit for reproducing the binary digital data signal from the received signal.

According to the present invention, a simple and useful circuit is obtained for reproducing the binary digital data signal.

Figure 1:
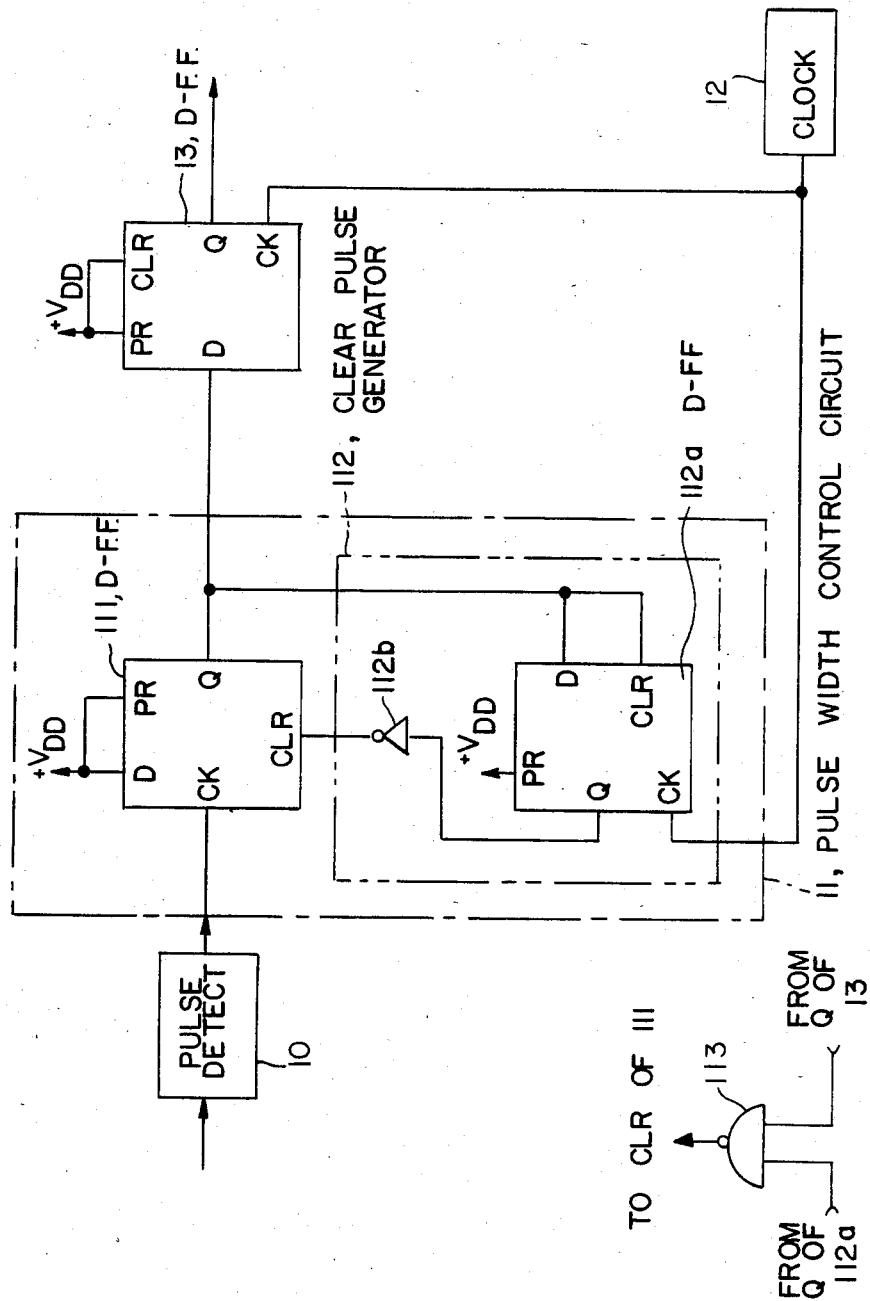
FIG. 1 is a schematic view illustrating a circuit diagram of an embodiment of the present invention.

Referring to FIG. 1, a circuit shown therein is applied to a receiver side of a digital transmission line transmitting the bi-polar signal as shown at b in FIG. 4.

A pulse detector 10, such as a dual sensing amplifier, detects pulses on the received signal such as at c in FIG. 4, and provides a first pulse train such as at d in FIG. 4, as described above.

The output of pulse detecting circuit 10 is applied to a pulse width control circuit 11 for providing a pulse of a controlled pulse width in response to an input pulse under control of a clock signal from a clock pulse generator 12.

Clock pulse generator generates clock pulses at time intervals as shown at e in FIG. 4. The time interval is equal to the bit length T of the binary digital data signal.

Pulse width control circuit 11 comprises a circuit 111 wherein once a pulse is applied into an input terminal thereof, a high level signal is maintained on an output terminal thereof until a clear signal is applied to a clear input terminal thereof. In the embodiment shown, a delayed flip-flop circuit (D-type flip-flop) is used as the circuit.

As well known in the prior art, D-type flip-flop includes a clock input terminal CK, a data input terminal D, a preset input terminal, an output terminal Q and an inverted output terminal $\overline{Q}$.

A relationship between each input signal and each output signal is shown at a function table in FIG. 2.

The following symbols are used in the function table in FIG. 2:

H=high level (steady state)
L=low level (steady state)
↑ =transition from low to high level
x=irrelevant (any input, including transitions)

With respect to D-type flip-flop 111, a pulse train from pulse detector 10 is applied to CK terminal, D terminal and PR terminals are maintained at a high level voltage by connecting to a positive voltage source $+V_{DD}$, and an output is taken out from Q terminal. Therefore, when a positive pulse is applied to CK terminal of D-type flip-flop 111 from pulse detector 10, the output signal on Q terminal is maintained at a high level "H" until a clear signal is applied to CLR terminal, as will be understood from the functional table in FIG. 2.

$\overline{Q}$ terminal is not used and therefore, is not shown in FIG. 1.

Pulse width control circuit 11 further comprises a clear pulse generator 112 for providing a clear pulse to CLR terminal of D-type flip-flop 111 in response to a clock pulse from clock pulse generator 12 during a time when Q terminal output is maintained at a high level "H". Clear pulse generator 112 comprises a D-type flip-flop 112a and an inverter 112b.

An input terminal PR of D-type flip-flop 112a is maintained at a high level "H" by a positive voltage source $+V_{DD}$, two input terminals D and CLR are commonly connected to an output terminal Q of D-type flip-flop 111 and the other input terminal CK is connected to clock pulse generator 12. Therefore, when a clock pulse is applied to CK terminal from clock pulse generator 12 during a time when Q terminal of D-type flip-flop 111 and therefore. D and CLR terminals of D-type flip-flop 112a are maintained at a high level "H", a high level signal "H" is outputted on Q terminal of D-type flip-flop 112a, as will be understood from the function table in FIG. 2.

The high level signal "H" is inverted at inverter 112b, from which a low level signal "L" is, in turn, applied to CLR terminal of D-type flip-flop 111. Then, Q terminal of D-type flip-flop 111 is changed to a low level signal "L". Accordingly, Q terminal output of flip-flop 112a is also changed to, and maintained at, a low level signal "L". Therefore, CLR terminal of D-type flip-flop 111 is maintained at "H" level and restores the initial condition for accepting a fresh pulse from pulse detector 10.

Thus, in response to an input pulse, pulse width control circuit 11 provides a pulse having a controlled pulse width which is determined by a time duration from an application of the input pulse to a clock pulse applied thereto after that.

The output signal of pulse width control circuit 11 is applied to a sampling circuit, such as a D-type flip-flop 13, and is sampled thereat by the clock pulse signal from clock pulse generator 12.

Two input terminals PR and CLR of D-type flip-flop 13 are maintained at "H" level by a positive voltage source $+V_{DD}$, D terminal being connected to the output terminal of pulse width control circuit 11, CK terminal to clock pulse generator 12. The D-type flip-flop also operates according to the function table in FIG. 2.

Therefore, when a clock pulse is applied to CK terminal of D-type flip-flop 13, if D terminal thereof is at "H" level, a high level signal "H" is outputted at its Q terminal and is maintained until the next clock pulse is applied to the CK terminal. On the contrary, if D terminal thereof is at "L" level, a low level signal "L" is outputted on the Q terminal and is also maintained until application of the next clock pulse to the CK terminal.

In operation, when one pulse of the pulse train (d in FIG. 4) is applied to CK terminal of D-type flip-flop 111 from pulse detector, Q terminal of D-type flip-flop 111 is changed to "H" level. Thereafter, when one clock pulse (e in FIG. 4) is applied to CK terminal of D-type flip-flop 112a from clock pulse generator 12, the clear pulse (h in FIG. 4) is applied to CLR terminal through inverter 112b, as described above. Therefore, the level on Q terminal of D-type flip-flop 111 is changed to "L" level. Thus, the output signal on Q terminal of D-type flip-flop 111 has a waveform as shown at f in FIG. 4, in response to the pulse train d in FIG. 4.

The signal waveform shown at g in FIG. 4 illustrates the output on Q-terminal of D-type flip-flop 112a.

The output signal (f in FIG. 4) from Q terminal of D-type flip-flop 111 is applied to D terminal of D-type flip-flop 13 and is sampled thereat by clock pulses from clock pulse generator 12, as described above.

When the high level signal (f in FIG. 4) from D-type flip-flop 111 to D terminal of D-type flip-flop 13 is cleared by the clear signal (h in FIG. 4) in response to one clock pulse (e in FIG. 4), the high level signal is sampled at D-type flip-flop 13 by the same clock pulse so that the output of Q terminal of D-type flip-flop 13 is changed to "H" level. When the next clock pulse is applied to CK terminal of D-type flip-flop 13, the output of Q terminal of D-type flip-flop 13 is returned to "L" level if the output of Q terminal of D-type flip-flop 111 is at "L" level. Thus, a one pulse of a pulse duration of T is obtained at Q terminal of D-type flip-flop 13, as shown at i in FIG. 4. On the contrary, if the output of Q terminal of D-type flip-flop 111 is already changed to "H" level again, the output of Q terminal of D-type flip-flop 13 is maintained at "H" level, as shown at i in FIG. 4.

Thus, the binary digital signal at a in FIG. 4 is reproduced and the reproduced signal (i in FIG. 4) is obtained from Q terminal of D-type flip-flop 13.

As will be understood from the above description, pulse width control circuit 11 is for modifying the pulse train from pulse detector 10 so that any one pulse of the pulse train can be sampled by the clock pulse.

In order to insure sampling of the pulse by the clock pulse, the inverter 112b may be preferably replaced by a NAND gate 113 as shown in FIG. 3. NAND gate 113 has two input terminals. One of them is connected to Q terminal of D-type flip-flop 112a and the other one is connected to Q terminal of D-type flip-flop 13. An output of NAND gate 113 is connected to CLR terminal of D-type flip-flop 111. In the embodiment, after the output of Q terminal of D-type flip-flop 13 is sampled by the clock pulse, the clear pulse is applied to CLR terminal of D-type flip-flop 111 through NAND gate 113.

I claim:

1. A circuit for reproducing a binary digital data signal with a predetermined bit length from a signal received at a receiver side in a data transmission system for transmitting said binary digital data signal from a transmitter side to said receiver side through a digital transmission line, which comprises:

pulse detecting circuit means for comparing said received signal with a reference signal level and detecting pulse signals on said received signal to provide a first pulse train comprising the detected pulses;

clock pulse generating means for generating clock pulses having a repetition time interval equal to said predetermined bit length;

first circuit means receiving said first pulse train from said pulse detecting means and said clock pulses from said clock pulse generating means and generating a second pulse train corresponding to said first pulse train, each one pulse of said second pulse train having a pulse width which is determined by a time duration from an application of a corresponding one pulse of said first pulse train to an application of one clock pulse from said clock pulse generating means after that;

second circuit means for sampling said second pulse train by said clock pulses from said clock pulse generating means, to thereby provide the reproduced digital data signal therefrom.

2. The digital data signal reproducing circuit as claimed in claim 1, wherein said second circuit means is a D-type flip-flop circuit which has a data input terminal connected to the output of said first circuit means, a preset and a clear input terminals maintained at a high level, a clock input terminal connected to said clock pulse generating means, and an output terminal outputting said reproduced digital data signal.

3. The digital data signal reproducing circuit as claimed in claim 1, wherein said first circuit means comprises third circuit means having an input terminal, a clear input terminal, and an output terminal providing a high level signal in response to one pulse applied to said input terminal until a clear pulse is applied to said clear input terminal, and fourth circuit means connected to said output terminal of said third circuit means and to said clock pulse generating means and providing said clear pulse to said clear input terminal of said third circuit means at a time when one clock pulse is inputted thereto from said clock pulse generating means during a time when said high level signal is applied thereto from said third circuit means, whereby said second pulse train is outputted from said output terminal of said third circuit means in response to said first pulse train applied to said input terminal thereof.

4. The digital data signal reproducing circuit as claimed in claim 3, wherein said third circuit means is a D-type flip-flop which has a clock input terminal connected to the output of said pulse detecting circuit means, and a preset and a data input terminals maintained at a high level.

5. The digital data signal reproducing circuit as claimed in claim 3, wherein said fourth circuit means comprises a D-type flip-flop circuit having a data and a clear input terminals commonly connected to said output terminal of said third circuit means, a clock input terminal connected to said clock pulse generating means, a preset input terminal maintained at a high level, and an output terminal providing a high level signal in response to a rising edge of the clock pulse applied to said clock input terminal during a time when a high level signal is commonly applied to said data and clear input terminals, and an inverter circuit means for inverting said high level signal from said output terminal of said D-type flip-flop circuit and providing the inverted signal to said third circuit means as said clear pulse.

6. The digital data signal reproducing circuit as claimed in claim 5, wherein said inverter circuit means is a NAND gate having two input terminals, one of which is connected to the output of said second circuit means, the other one being connected to the output terminals of said D-type flip-flop.

* * * * *